United States Patent [19]

Armstrong

[11] 4,391,668

[45] Jul. 5, 1983

[54] MIXED OXIDE OXYGEN ELECTRODE

[75] Inventor: William A. Armstrong, Ottawa, Canada

[73] Assignee: Her Majesty the Queen in right of Canada, as represented by the Minister of National Defence, Ottawa, Canada

[21] Appl. No.: 256,665

[22] Filed: Apr. 22, 1981

[30] Foreign Application Priority Data

Sep. 2, 1980 [CA] Canada .................................. 360068

[51] Int. Cl.³ ........................... C09J 5/02; C25D 3/12
[52] U.S. Cl. ............................. 156/308.2; 204/290 R; 427/126.6; 427/226
[58] Field of Search ............... 148/6.14 R; 427/126.6, 427/226, 327, 372.2, 409; 156/308.2; 428/422, 469; 204/290 R, 291, 281, 290 L

[56] References Cited

U.S. PATENT DOCUMENTS

4,132,619  1/1979  Klein et al. ...................... 204/290 R
4,279,713  7/1981  Tseung et al. .................. 204/290 R

*Primary Examiner*—Jerome W. Massie
*Assistant Examiner*—F. K. Wine
*Attorney, Agent, or Firm*—Cushman, Darby & Cushman

[57] ABSTRACT

The invention disclosed is a novel method for the preparation of a nickel/cobalt oxide impregnated nickel plaque material involving a single oxidation step. The nickel plaque material is cleaned, impregnated with an aqueous cobalt nitrate solution and dried. The nickel/cobalt oxide is then formed in a single oxidation step.

9 Claims, 3 Drawing Figures

MIXED OXIDE OXYGEN ELECTRODE

BACKGROUND OF THE INVENTION

This invention relates to the preparation of a nickel/cobalt oxide impregnated nickel plaque material.

Mixed oxides are receiving considerable attention as catalysts both for oxygen reduction (fuel cells and metal/air batteries) and oxygen evolution (electrolytes). The problem is to prepare these catalysts inexpensively and to incorporate them into practical electrode structures. One mixed oxide of particular interest is nickel/cobalt spinel of the formula $NiCo_2O_4$.

British Pat. No. 1,461,764 Published Jan. 19, 1977 to Walter J. King et al, discloses methods for the preparation of nickel/cobalt spinel which include the coprecipitation of nickel oxalate and cobalt oxalate followed by a heat treatment or freeze drying of the nitrates of nickel/cobalt followed by decomposition in vacuo and a heat treatment. The heat treatment is effected at about 400° C. for 10 hours. These catalyst powders so formed are then mixed with carbon, for increased electrical conductivity, and a polytetrafluoroethylene binder and pressed onto a metal screen which acts as a current conductor. This method is quite complex. The freeze drying of the nitrates is advantageous from the point of view of high catalytic activity but is a very time consuming and costly procedure.

In Canadian Pat. No. 834,890, which issued on Feb. 17, 1970 to John H. Sizer et al, a method for the preparation of a nickel/cobalt oxide impregnated nickel plaque material is described. In the disclosed method, a layer of nickel oxide is formed on the plaque in a first oxidation step by heat treatment at 650° C. The oxidized material is then impregnated with cobalt nitrate and a second oxidation step is performed at 500° C. to form cobalt oxide and to react the cobalt oxide so formed with the already present nickel oxide, to form the nickel/cobalt spinel. This procedure is also time consuming and complex because of the multiple oxidation steps.

Both of the aforementioned patents involve heat treatments at 400° to 650° C. Applicant has found that heat treatments at such high temperatures have deleterious effects as well be apparent hereinafter.

DETAILED DESCRIPTION OF THE INVENTION

According to one aspect of the invention, a method for the preparation of a nickel/cobalt oxide impregnated nickel plaque material is contemplated, comprising
 (a) providing a substantially oxide free sintered metal plaque material;
 (b) dipping the nickel plaque in an aqueous solution of cobalt nitrate;
 (c) drying the cobalt nitrate impregnated plaque so formed; and
 (d) heat treating at about 200° to 350° C. for about 1 to 8 hours, to form the nickel/cobalt oxide impregnated nickel plaque material.

BRIEF DESCRIPTION OF THE DRAWINGS

In the drawing which serves to illustrate the preferred embodiments of the invention.

The following examples described in detail methods for preparing electrodes containing a nickel/cobalt oxide catalyst.

EXAMPLE I

A 3.18×3.18 cm square flat plate of thickness of 0.071 cm of clean dry sintered nickel plaque with a 1.27×1.27 cm tab extending from one corner was dipped in an aqueous solution containing 800 mg/ml of cobalt nitrate hexahydrate $(Co(NO_3)_2.6H_2O)$. The plaque was drained, dried over a hot plate and left to dry thoroughly overnight in an oven at 125° C. The plaque was then transferred to a furnace at 250° C. where it was left for 4 hours. This electrode proved suitable for catalysis of the evolution of oxygen in an electrolysis cell.

EXAMPLE II

Figure 1:
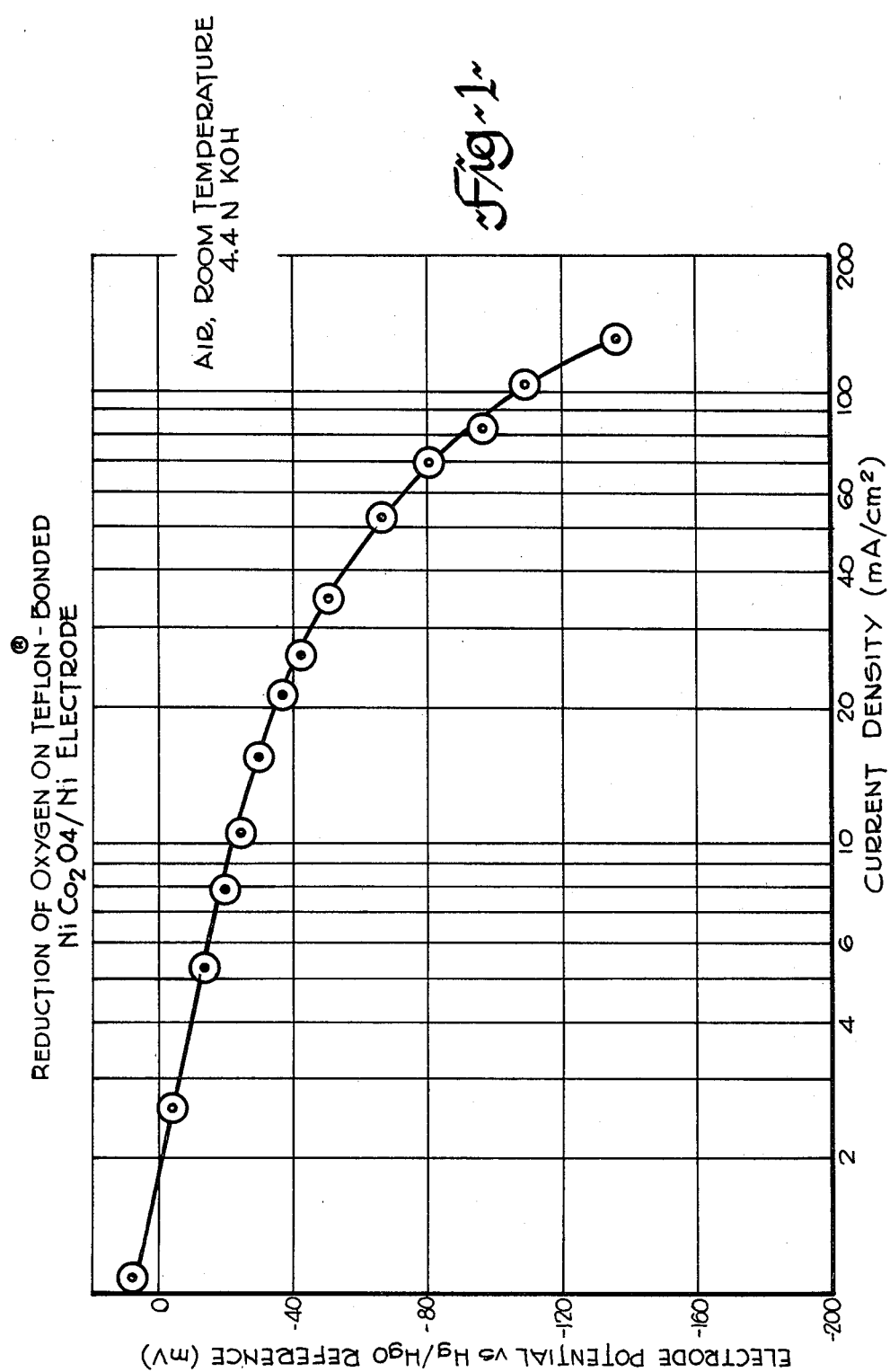
FIGS. 1 to 3 are graphs illustrating the operation of electrodes made of the nickel/cobalt spinel prepared in accordance with the invention.

A 3.18×3.18 cm square flat plate of thickness 0.071 cm of clean dry sintered nickel plaque with a 1.27×1.27 cm tab extending from one corner was dipped in an aqueous solution containing 800 mg/ml of cobalt nitrate hexahydrate and 130 mg/ml polytetrafluoroethylene. This solution was prepared adding 8.00 g of cobalt nitrate hexahydrate to a 10.0 ml volumetric flask, dissolving it in a little distilled water, adding 1.5 ml Teflon ® 30B and adding sufficient distilled water to bring the liquid level to the 10.0 ml mark and mixing thoroughly. The saturated plaque was drained, dried over a hot plate and left to dry thoroughly overnight in an oven at 125° C. The plaque was then transferred to a furnace at 250° C. where it was left for 4 hours. One side of the electrode was then covered with a piece of Zitex ® E606-223 polytetrafluoroethylene membrane which was pressed onto the electrode at 125° C. and 112 kg/cm². This electrode proved suitable for the reduction of oxygen as is demonstrated in FIG. 1 which is a plot of electrode potential vs current density in an electrolyte comprised of 4.4N potassium hydroxide.

Figure 2:
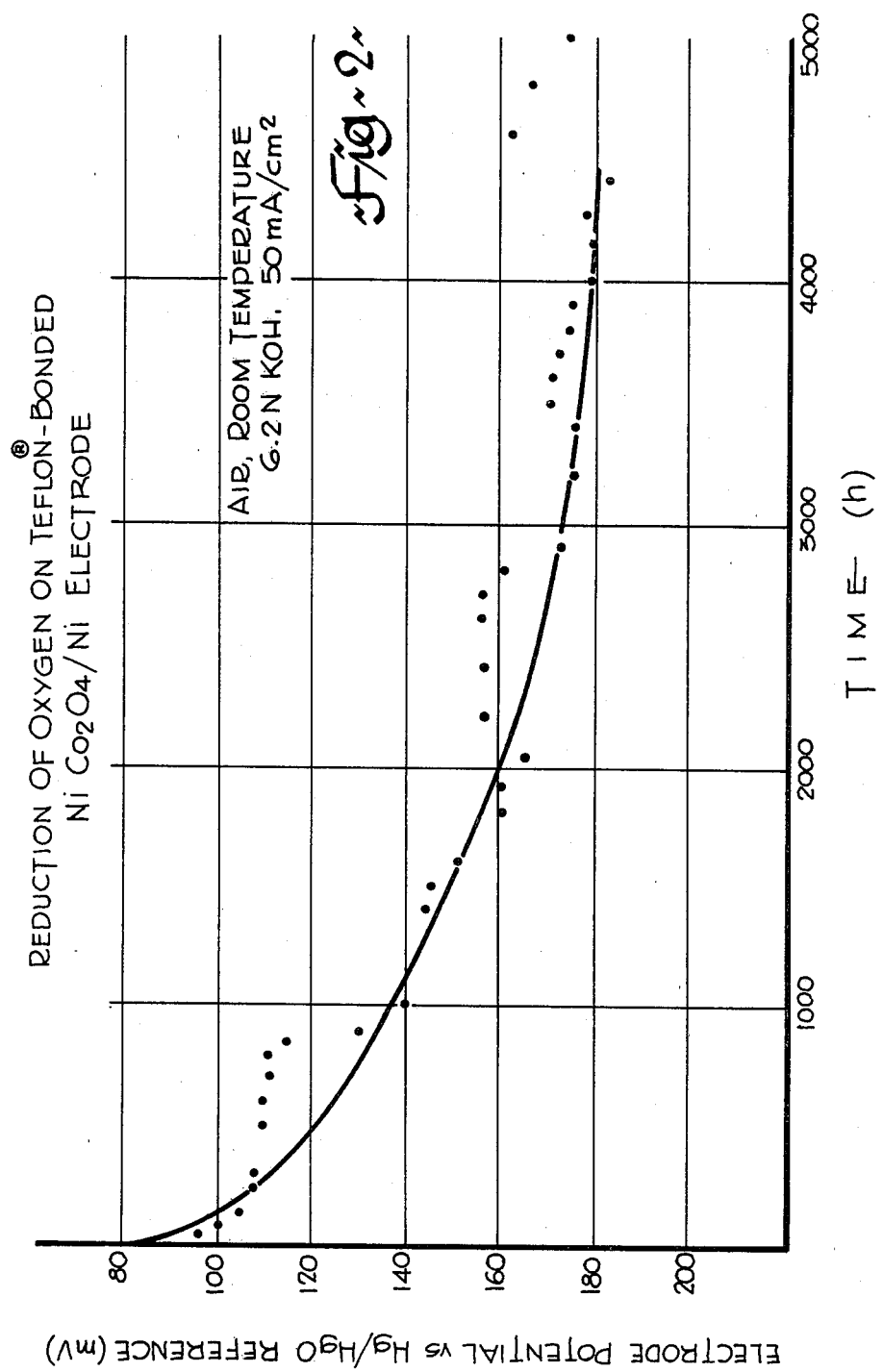

A cell consisting of a cathode prepared as described in Example II, a nickel screen counter electrode, a mercury-mercuric oxide reference electrode and a 6.2N potassium hydroxide electrolyte was driven at a current density corresponding to 50 mA/cm² on the cathode. As shown in FIG. 2, the cathode was still performing satisfactorily after 5000 hours of operation.

EXAMPLE III

A 3.18×3.18 cm square flat plate of thickness of 0.071 cm of clean dry sintered nickel plaque with a 1.27×1.27 cm tab extending from one corner was dipped in an aqueous solution containing 800 mg/ml of cobalt nitrate hexahydrate. The plaque was drained, dried over a hot plate and left to dry thoroughly overnight in an oven at 125° C. and then transferred to a furnace at 250° C. where it was left for 2 hours. One side of the plaque was covered with a piece of Zitex ® E606-223 polytetrafluoroethylene membrane which was cold-pressed onto the plaque. A solution containing 800 mg/ml of cobalt nitrate hexahydrate and 130 mg/ml polytetrafluoroethylene was added drop-wise to the bare side of the plaque until the plaque was saturated. The plaque was drained, dried over a hot plate and placed for 1 hour in an oven at 125° C. The Zitex ® cover was then removed and the plaque placed in a furnace at 250° C. where it was left for 3 hours. This resulted in a flat plate electrode catalyzed evenly throughout with nickel/cobalt oxide but wet-proofed with polytetrafluoroethylene on only one side. The wet-proofed side was covered with a piece of Zitex ® E606-223 polytetrafluoroethylene membrane which was pressed onto the electrode at 125° C. and 112 kg/cm².

Figure 3:
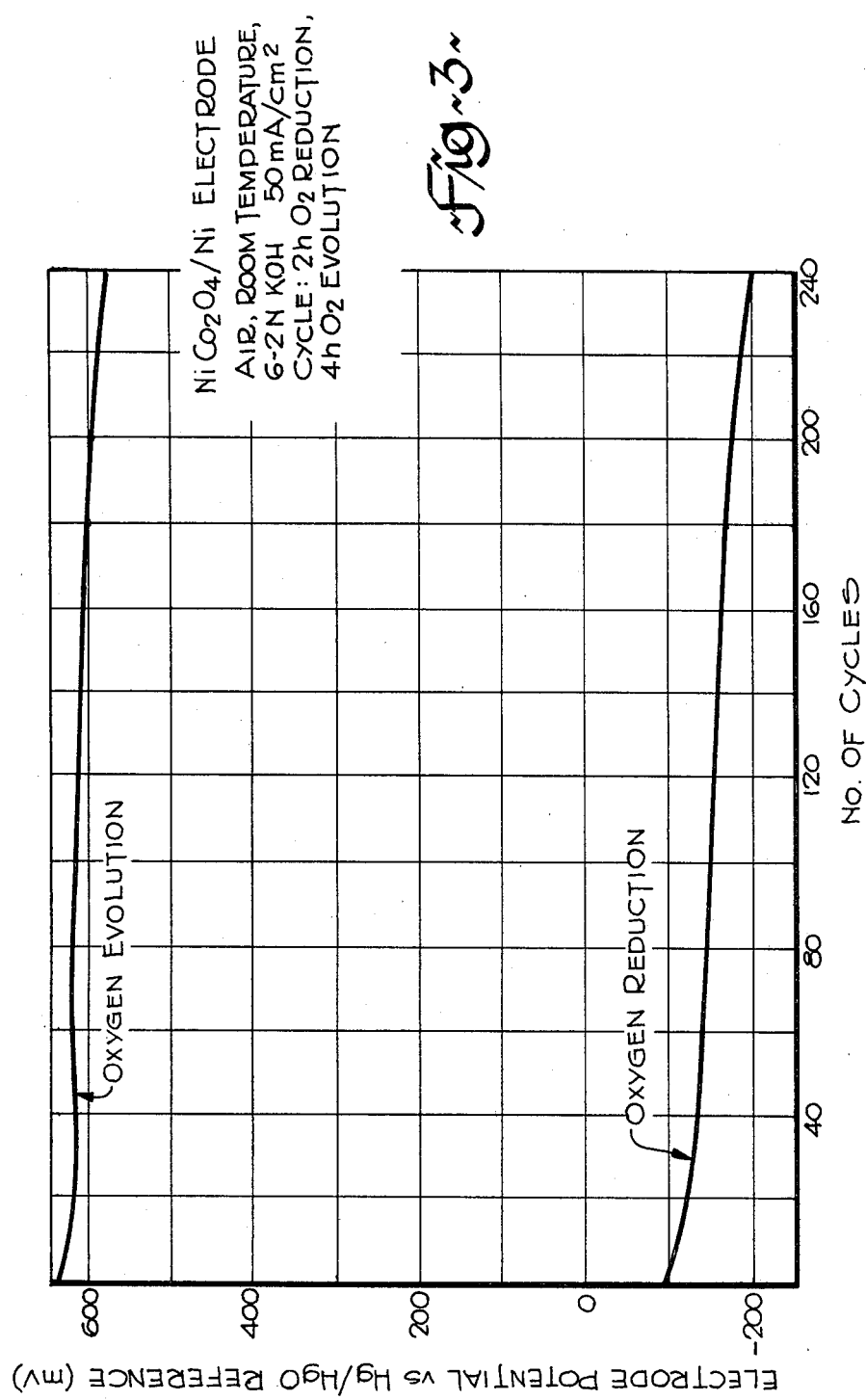

This electrode was used both for the evolution and reduction of oxygen. A cell was prepared with this electrode mounted so that the side covered with polytetrafluoroethylene membrane had free access to the air while the other side was in contact with 6.2N KOH electrolyte. A nickel screen counter electrode and a mercury-mercuric oxide reference electrode completed the cell. By means of a power supply and a timing device, the nickel/cobalt oxide electrode was forced to alternately reduce oxygen and evolve oxygen in a manner similar to the requirements of an electrically rechargeable metal/air battery. The cycle consisted of 2 hours of oxygen reduction at a current density of 50 mA/cm² followed by 4 hours of oxygen evolution. The results on FIG. 3 show that the electrode can operate satisfactorily for more than 200 such cycles.

As mentioned above, applicant has found that high oxidation temperatures produce certain deleterious effects on electrode performance.

Examples IV, V and VI illustrate the adverse affects of high oxidation temperatures. These electrodes were prepared in much the same way as Example II but with the following differences (i) the impregnation solution contained 600 mg/ml of cobalt nitrate and 87 mg/ml PTFE,
(ii) the drying time at 125° C. was only one hour and
(iii) Electrode IV was oxidized for 4 hours at 200° C. and Electrode V for 4 hours at 350° C.

The potential of each of these electrodes in 6.2N KOH with respect to a mercury/mercuric oxide reference electrode is given below for a number of current densities.

| ELEC-TRODE | OXIDA-TION TEMPER-ATURE | POTENTIAL vs Hg/HgO | | | 106mA/cm³ |
|---|---|---|---|---|---|
| | | 26 | 53 | 83 | |
| IV | 200° C. | −77mV | −118mV | −160mV | −180mV |
| V | 250° C. | −62 | −86 | −113 | −125 |
| VI | 350° C. | −131 | −195 | −277 | — |

It is evident that the electrode oxidized at 250° C. performed better than either of the other electrodes and the performance of the electrode oxidized at 350° C. (Electrode VI) was poorest. It would not support a current density of 106 mA/cm².

EXAMPLE VII

A clean dry sintered nickel plaque of the same dimensions as given in the other Examples was dipped into an aqueous solution containing 600 mg/ml of cobalt nitrate hexahydrate. The plaque was drained, dried over a hot plate and left to dry for 1 hour in an oven at 125° C. and then transferred to a furnace at 250° C. where it was left to oxidize for 4 hours. The plaque was then washed in flowing distilled water for 15 minutes, drained, dried in an oven at 125° C. for 10 minutes and dipped in a solution prepared by mixing 0.5 ml of Teflon ® 30-B with 5 ml of distilled H₂O. The plaque was drained, dried in an oven at 125° C. for 1 hour and then placed on a hot plate at 250° C. for 3 minutes. One side of the flat plate electrode was covered with a piece of Zitex ® E606 223 polytetrafluoroethylene membrane which was hot pressed onto the electrode at 125° C. and 112 kg/cm².

EXAMPLE VIII

The electrode was prepared in the same way as VII except that the oxidation step was carried out for 4 hours in a furnace at 350° C. rather than 250° C. The potential of each of these electrodes, in 6.2N KOH with respect to a mercury/mercuric oxide reference electrode is given below for a number of current densities.

| ELEC-TRODE | OXIDA-tion TEMPER-ATURE | POTENTIAL vs Hg/HgO | | | 106mA/cm² |
|---|---|---|---|---|---|
| | | 16 | 26 | 53 | |
| VII | 250° C. | −66mV | −96mV | −165mV | −299mV |
| VIII | 350° C. | −96 | −149 | −257 | — |

Electrode VIII, oxidized at 350° C. would not support a current density of 106 mA/cm². This further illustrates the deleterious effects of higher oxidation temperatures.

It is essential to the invention that the starting material, the nickel plaque, be substantially oxide free. Specifically, there must not be a layer of nickel oxide on the plaque prior to impregnation with the cobalt nitrate solution.

Typically, the nickel plaque is pre-cleaned according to the following procedure. The porous sintered nickel plaque is first degreased by soaking in trichloroethylene for ten minutes. The plaque is then rinsed with methanol to remove the trichloroethylene. After drying at room temperature the plaque is covered with a dilute solution of nitric acid (20 ml of concentrated HNO₃ diluted to 100 ml with distilled water) and left for 2 minutes. This dissolves any oxides which may be on the surface of the plaque. The plaque is next washed in flowing distilled water for 15 minutes, drained and dried in an oven at 125° C. for not more than 10 minutes (too low a temperature and short a time to form nickel oxide). As soon as it becomes sufficiently cool, the plaque is immersed in the impregnation solution.

In view of the preferred embodiments described above, it should be apparent to those skilled in the art that the present invention may be embodied in forms other than those specifically described herein without departing from the spirit or central characteristics of the invention. Thus, the specific embodiments described herein are to be considered as illustrative and by no means restrictive.

The embodiments of the invention in which an exclusive property or privilege is claimed are defined as follows:

1. A method for the preparation of a nickel/cobalt oxide impregnated nickel plaque material, comprising
   (a) providing a substantially oxide free sintered nickel plaque material;
   (b) dipping the nickel plaque in an aqueous solution of cobalt nitrate and polytetrafluoroethylene as a wetproofing agent;
   (c) drying the cobalt nitrate impregnated plaque so formed; and
   (d) heat treating at about 200° to about 250° C. for about 1 to 8 hours, to form the nickel/cobalt oxide impregnated nickel plaque material.

2. A method according to claim 1, wherein the concentration of the aqueous cobalt nitrate is 200 to 800 mg/ml.

3. A method according to claim 2, wherein the concentration of the aqueous cobalt nitrate is about 800 mg/ml.

4. A method according to claim 2, wherein the heat treatment is effected at about 250° C. for about 4 hours in a drying furnace.

5. A method according to claim 1 wherein step (c) the plaque is air dried at about 125° C. for about 12 hours.

6. A method according to claim 1, 2 or 4, wherein immediately prior to step (a) the nickel plaque is subjected to a cleaning treatment to remove oxides which may be on the surface of the plaque.

7. A method according to claim 1, wherein the nickel plaque material is in the form of a flat plate and including the additional steps of
   (g) covering one side of the plate with a polytetrafluoroethylene membrane; and
   (h) hot pressing the membrane onto the plate.

8. A method for the preparation of a nickel/cobalt oxide impregnated nickel plaque material, comprising the steps of:
   (a) providing a substantially oxide-free sintered nickel plaque material;
   (b) dipping the nickel plaque in an aqueous solution of cobalt nitrate;
   (c) drying the cobalt nitrate impregnated plaque so formed;
   (d) heat treating at about 200° to 250° C. for about 1 to 8 hours, to form the nickel/cobalt oxide impregnated nickel plaque material;
   (e) covering one side of the plate with a polytetrafluoroethylene membrane;
   (f) cold pressing the membrane onto the plate;
   (g) exposing the other side of the plate to aqueous cobalt nitrate and polytetrafluoroethylene solution;
   (h) drying the plate;
   (i) removing the polytetrafluoroethylene covering from said one side of the plate;
   (j) heat treating the plate at about 250° C. for about 3 hours, to form a plate wet-proofed only on said other side of the plate;
   (k) covering the wet-proofed side of the plate with a polytetrafluoroethylene membrane; and
   (l) hot-pressing the membrane onto the plate.

9. A method according to claim 8 wherein the concentration of the aqueous cobalt nitrate is 200 to 800 mg/ml.

* * * * *